United States Patent [19]

Cheng et al.

[11] Patent Number: 4,650,507
[45] Date of Patent: Mar. 17, 1987

[54] WET AND DRY DISTILLATIVE FREEZING PROCESS FOR SEPARATING MIXTURES AND APPARATUSES FOR USE THEREIN

[76] Inventors: Chen-Yen Cheng; Sing-Wang Cheng, both of 9605 La Playa St., NE, Albuquerque, N. Mex. 87111

[21] Appl. No.: 744,070
[22] PCT Filed: May 21, 1985
[86] PCT No.: PCT/US85/00967
  § 371 Date: May 21, 1985
  § 102(e) Date: May 21, 1985
[87] PCT Pub. No.: WO84/00096
  PCT Pub. Date: Jan. 19, 1984
[51] Int. Cl.⁴ .............................................. F25J 5/00
[52] U.S. Cl. ........................................ 62/12; 62/537; 23/294 S; 34/5
[58] Field of Search ............... 62/12, 532, 537; 23/294 S; 156/611, 614; 34/5

[56] References Cited

U.S. PATENT DOCUMENTS

| | | | |
|---|---|---|---|
| 1,534,130 | 4/1925 | McAfee et al. | 23/294 S |
| 1,901,486 | 3/1933 | Wurster | 23/294 S |
| 2,592,933 | 10/1951 | Houvener | 62/14 |
| 2,715,323 | 8/1955 | Johnson et al. | 62/14 |
| 2,737,784 | 3/1956 | Becker et al. | 62/14 |
| 2,738,658 | 3/1956 | Bronson | 62/12 |
| 2,777,299 | 1/1957 | Skaperdas | 62/15 |
| 2,812,645 | 11/1957 | Locklair et al. | 62/14 |
| 3,042,501 | 7/1962 | Noblitt | 23/294 S |
| 3,193,395 | 7/1965 | Tabler et al. | 62/537 |
| 3,298,796 | 1/1967 | Van Dammie et al. | 62/537 |
| 3,425,235 | 2/1969 | Cox | 62/537 |
| 3,690,116 | 9/1972 | Cheng et al. | 62/537 |
| 3,859,069 | 1/1975 | Seliber | 62/537 |
| 3,930,800 | 1/1976 | Schoener et al. | 23/294 R |

Primary Examiner—Ronald C. Capossela

[57] ABSTRACT

Distillative Freezing Process is an energy conserving process for separating mixtures and superpurifying chemicals. The wet and dry distillative freezing process disclosed represents a major improvement to the distillative freezing technology and has significantly broadened its application field: the drying-up temperature and pressure are significantly higher than those of the corresponding direct dry process and a major fraction of low volatility impurities in the feed can also be removed. A basic wet and dry distillative freezing process comprises (a) a first step of transforming a liquid feed mixture into a first solid-liquid mixture, denoted as $K_1$ mixture, (b) a second step of washing the $K_1$ mixture with a wash liquid to thereby form a second solid-liquid mixture, denoted as $K_2$ mixture, and an impure liquid $L_2$, and (c) a third step of subjecting the $K_2$ mixture to a dry distillative freezing operation to thereby form a mass of refined solid phase, denoted as $S_3$, and a low pressure vapor $V_3$. Various wash liquids may be used in the crystal washing step. It is important to note that the wash liquid used does not have to be a pure liquid but may contain some volatile impurities. This is so because the volatile impurities in the wash liquid will be taken up in the $K_2$ mixture and will be removed in the dry distillative freezing step. Solid Recycle Distillative Freezing Process is another version in which $K_2$ mixtures is formed by mixing the feed with a mass of recycled solid and subjecting the $K_2$ mixture to a dry distillative freezing operation.

19 Claims, 21 Drawing Figures

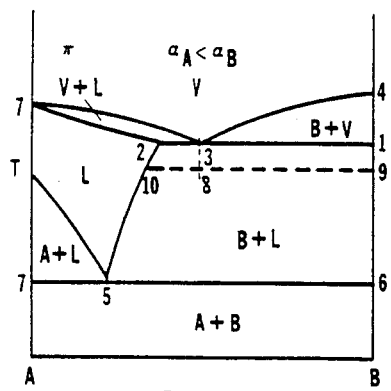
Figure 1
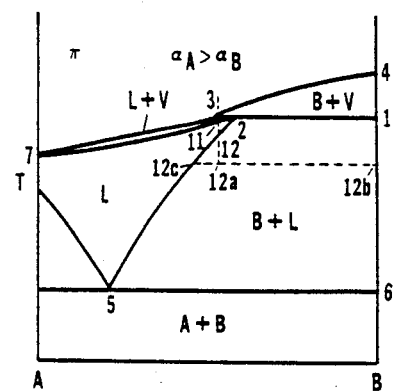
Figure 2
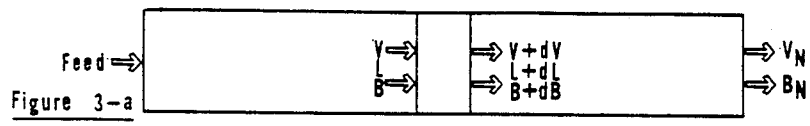
Figure 3-a
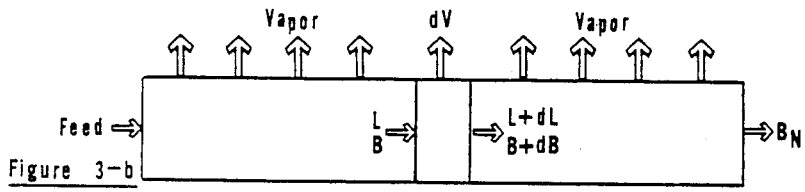
Figure 3-b
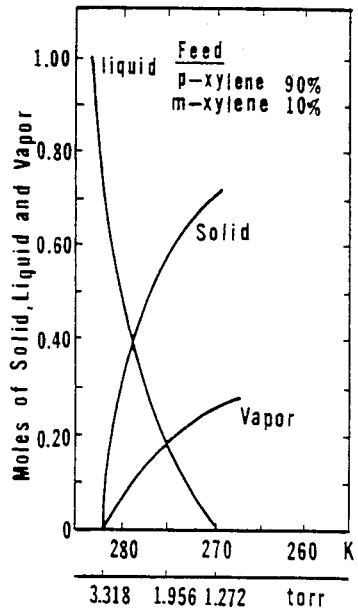
Figure 4-a
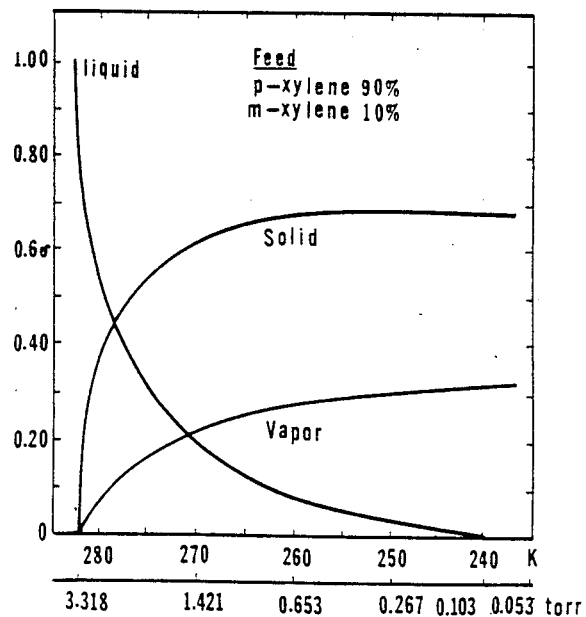
Figure 4-b

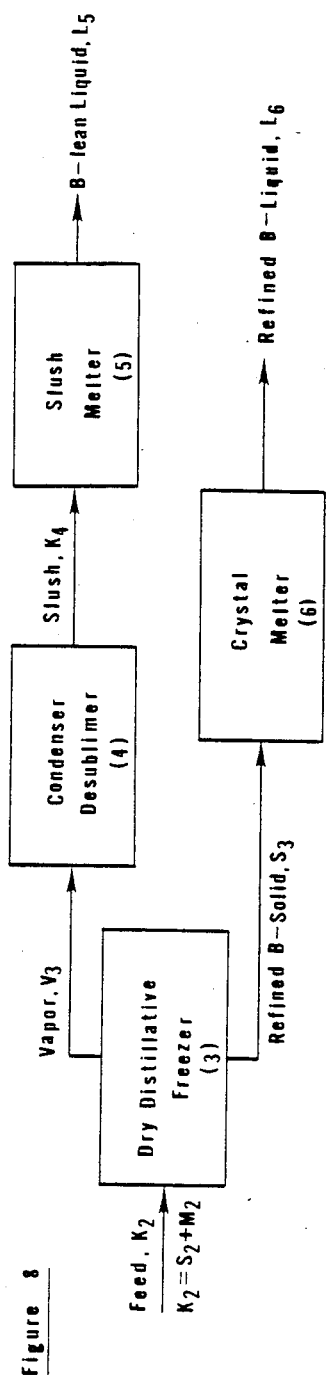
Figure 8
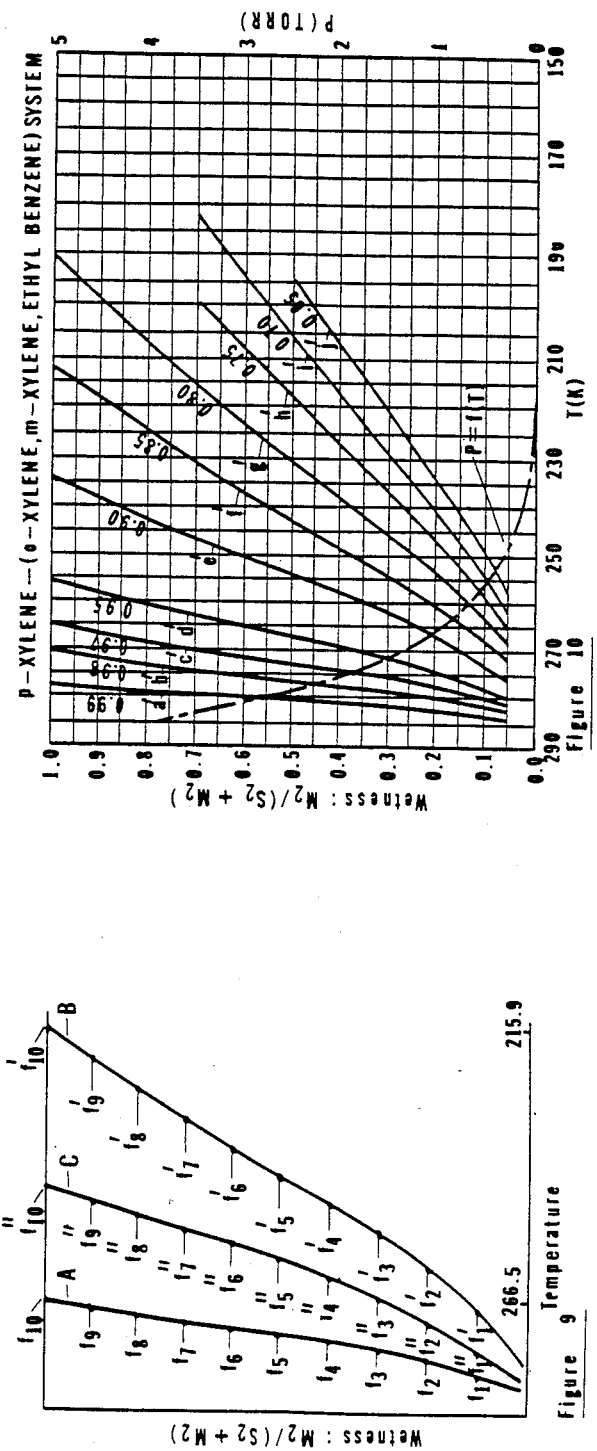
Figure 10
Figure 9

WET AND DRY DISTILLATIVE FREEZING PROCESS FOR SEPARATING MIXTURES AND APPARATUSES FOR USE THEREIN

1. TECHNICAL FIELD

Separation of a mixture containing at least one volatile component is a very important operation in chemical industries. In some cases, the required product purities are very high. Examples are production of polymerization grade monomers, such as ethylene, propylene, styrene, butadiene and p-xylene. Distillation operations have been used in most cases and freezing operations have been used in some special cases. The distillative freezing process disclosed combines the advantageous features of both the distillation and freezing operations and remove their disadvantages. The wet and dry distillative freezing process disclosed herein represents a major improvement to the distillative freezing technology.

2. BACKGROUND ART

When a distillation operation is used in separating a mixture containing components that are very close in boiling points and volatilities, the number of plates required is very large and a large reflux ratio has to be used. Therefore, both the equipment cost and operating cost are very high. Furthermore, these costs increase greatly as the required product purity increases. Separations of ethylene-ethane mixtures, propylene-propane mixtures, styrene-ethyl benzene mixtures and p-xylene-m-xylene mixtures in producing high grade ethylene, propylene, styrene and p-xylene respectively are good examples. There is a great need for finding a better and more economical way of accomplishing the desired separations.

In a conventional fractional solidification process, a feed containing a crystallizing component and one or more impurities is brought into a two phase solid-liquid region to form a mixture containing crystals of the crystallizing component and a liquid mixture containing the impurities. An expensive scraped surface freezer is usually used in this operation. A centrifuge or a hydraulic washing column is then used to free the crystals from the mother liquor. Even though the crystals formed are usually very pure, it has been very difficult to produce a very high purity product of the crystallizing component because a complete separation of the crystals from the surrounding impure liquid phase is difficult. Furthermore, equipment cost of a conventional solidification process is usually very high.

It is important to distinguish the distillative freezing process of the present invention from a vacuum freezing desalination process, a vacuum crystallization process, a vacuum drying process, and a conventional desublimation process for removing a component from a gas mixture. In a vacuum freezing desalination process (also called an evaporative freezing process), only one component (water) vaporizes and the same component (water freezes. In a vacuum crystallization process or a vacuum drying process, only one component (solvent) evaporates while the other component (solute) crystallizes. In a conventional desublimation process, a gas mixture is cooleded down to a very low temperature to remove a crystallizing component (e.g. carbon dioxide or phthalic anhydride) by a desublimation operation and simply discharge the residual gas. In a distillative freezing process, two or more components are vaporized from a feed under a sufficiently reduced pressure and only one component freezes. The low pressure vapor formed in a distillative freezing process may be transformed completely into a condensed mass without pressurization by slightly lowering its temperature. The phase behaviour of a system to which a distillative freezing process applies is distinct from phase behaviors of systems to which these conventional processes apply.

The distillative freezing process described in U.S. Pat Nos. 4,218,893, 4,378,984, 4,451,237 and 4,433,558 are mostly concerned with basic and direct dry distillative freezing operations. The wet and dry distillative freezing process disclosed herein has several advantages over the direct dry approach: the drying-up temperature and pressure of the former are substantially higher than those of the latter and the former can even remove a major fraction of a low volatility impurity. Therefore, the field of application of the distillative freezing technology has been greatly broadened by the introduction of the wet and dry approach.

3. DISCLOSURE OF INVENTION

The distillative freezing process described in U.S. Pats. Nos. 4,218,893, 4,378,984 and 4,451,237 is a highly effective and energy-conserving process for separating a mixture containing volatile components with clsoe volatilities and produces a super pure product of the major component. The parallel contact distillative freezing process described in U.S. Pat. No. 4,433,558 is an improved distillative freezing process. Most of the descriptions given in these patents are directed to "direct dry distillative freezing operations." The wet and dry distillative freezing process described herein represents a major improvement to the distillative freezing technology. It will be shown that the wet and dry approach has several advantages over the direct dry approach. The first major advantage is that the drying-up temperature and pressure in the wet and dry approach are significantly higher than the corresponding values in the direct dry approach. The differences become very substantial as the impurity concentration in the liquid phase increases. Therefore, the wet and dry approach is recommended when the impurity concentration is higher than say 5 to 10%. The second major advantage is that the wet and dry approach can even remove a major fraction of a low volatility impurity. Therefore, the field of application of the distillative freezing technology has been significantly broadened by the introduction of the wet and dry approach.

Both a direct dry distillative freezing process and a dry distillative freezing sub-process (the dry part of a wet and dry distillative freezing process) comprise two major operations. In the first step, the liquid phase mass in the feed mixture is partially vaporized under a reduced pressure to thereby crystallize the crystallizing component of the mixture simultaneously. This operation is continued to completely eliminate the liquid phase and bring the mixture into the two phase solid-vapor region. Then, the solid phase is no longer contaminated by the adhering liquid phase and gives a super-pure product of the crystallizing component. In the second step, the low pressure vapor is transformed into a condensed mass by cooling the vapor. The operating temperature and pressure at which a mixture is taken to dryness are called the drying-up temperature and drying-up pressure respectively.

In some versions, the wet and dry distillative freezing process comprises (a) a first step of transforming a liquid feed mixture into a first solid-liquid mixture, denoted as $K_1$ mixture, by either a conventional freezing operation or a wet distillative freezing operation, (b) a second step of washing the $K_1$ mixture with a wash liquid to thereby form a second solid-liquid mixture, denoted as $K_2$ mixture, and an impure liquid $L_2$, and (c) a third step of subjecting the $K_2$ mixture to a dry distillative freezing operation to thereby form a mass of refined solid phase, denoted as $S_3$, and a low pressure vapor $V_3$. The refined solid $S_3$ is melted to become refined product $L_6$; the low pressure vapor $V_3$ is condensed and becomes a mass of impure liquid $L_5$. The impurities in the feed are incorporated in $L_2$ and $L_5$ streams. The low volatility impurities are removed during the crystal washing step. Solid recycle distillative freezing process is another version of the wet and dry distillative freezing process. In this process, a mass of feed is mixed with a mass of recycled B-enriched solid to form a solid-liquid mixture, denoted as $K_2$ mixture, and then subject the $K_2$ mixture to a dry distillative freezing operation. In this disclosure, "a condensed mass" is used to mean a mass of liquid, or a mass of solid, or a mass of solid-liquid mixture.

Various wash liquids may be used in the crystal washing step. It is important to note that the wash liquid used does not have to be a pure liquid but may contain some volatile impurities. This is so because the volatile impurities in the wash liquid will be taken up in the $K_2$ mixture and will be removed in the dry distillative freezing step. However, the concentration of a low volatility impurity in the wash liquid has to be limited to a low value, because the low volatility impurity cannot be removed effectively in the dry distillative freezing step. Convenient wash liquids to use are (a) a mass of the feed liquid, (b) a mass of the condensate liquid, and (c) a part of the product liquid. One may also use a solution containing the crystallizing component and a selected volatile component as a wash liquid. The impurity concentration in the liquid phase of the $K_2$ mixture is usually lower than that in the $K_1$ mixture. By using either a mass of condensate liquid or a solution containing the crystallizing component and a selected volatile component as the wash liquid, the major impurities in the liquid phase of $K_2$ mixtures are all volatile and can be removed in the dry distillative freezing step.

The drying-up temperature and pressure in subjecting a $K_2$ mixture to a dry distillative freezing operation increase as the wetness is lowered and the impurity concentratiton in the mother liquor is lowered. By properly conducting crystal washing and crystal separating operations, impurity concentration and the wetness are lowered. Thus, the drying-up temperature and pressure are increased.

A new way of handling the vapor formed in a distillative freezing step is also disclosed. The distillatiive freezing operation may be a direct dry distillative freezing operation, a wet distillative freezing operation or a dry distillative freezing operation. The vapor formed in a distillative freezing operation, denoted as a primary vapor, is at a pressure lower than the triple point pressure of the crystallizing component. When the vapor is cooled without a substantial pressurization it may form a solid-liquid mixture and some solid phase mass may adhere to the cooling surface. Thw solid mass is melted by a secondary vapor whose pressure may be somewhat higher than the triple point pressure of the B-component. These operations are conducted in a condenser enclosed within an enclosure provided with a first valve and a second valve. The first vapor is admitted into the condenser through the first valve to thereby form some solid mass on the cooling surface. Then, secondary vapor is introduced through the second valve to melt the solid mass. The operations described are repeated alternately. Several wet and dry distillative freezing units are also described.

4. BRIEF DESCRIPTION OF DRAWINGS

In a wet and dry distillative freezing process, there is a step of subjecting a solid-liquid mixture, denoted as $K_2$ mixture, to a dry distillative freezing operation. The $K_2$ mixture contains a crystallizing component, denoted as B-component, and one or more non-crystallizing components. The non-crystallizing component existing in the largest amount is denoted as A-component. The $K_2$ mixture contains a mass of crystals, denoted as $S_2$, and a mass of liquid phase, denoted as $M_2$. The solid phase is substantially pure B-component, and the liquid phase contains A and B-components. For the process to work, the binary system of the A and B components has to show a certain type of phase behaviors.

FIGS. 1 and 2 respectively illustrate low pressure phase diagrams of Type 1 and Type 2 systems to which the process can be applied. The characteristic features of systems to which the process can be applied will be explained by referring to these figures.

FIG. 3-a illustrates the ideal parallel contact distillative freezing operation (Method 1), illustrating cocurrent movements of solid, liquid and vapor in the processing zone and illustrating a constant interaction of the vapor and liquid. Vapor is discharged only at the final stage. FIG. 3-b illustrates the differential vapor discharge distillative freezing operation (Method 2). In this method, vapor is removed from the processing zone as it is formed and therefore is not allowed to interact with the liquid downstream. Advantages of Method 1 over Method 2 will be described. An actual parallel contact distillative freezing operation will be referred to as a Method 3 operation.

FIGS. 4-a and 4-b compare the performances of the ideal parallel contact distillative freezing operation and the differential vapor discharge distillative freezing operation used in direct dry distillative freezing processes processing a liquid feed containing 90% p-xylene and 10% m-xylene. They show that the former method has advantages over the latter method: the yield is higher in the former method, 0.73 mole vs. 0.68 mole; the drying-up pressure is higher in the former method, 1.272 torr vs. 0.053 torr; the final three phase temperature is higher in the former method, 268.6 K vs. 234 k. FIG. 5 illustrates the performances of Method 1 operations as applied to liquid feed mixtures of p-xylene and m-xylene containing 80%, 85%, 90% and 95% p-xylene. It shows that the drying-up temperature and drying-up pressure decrease as the impurity concentration increases. FIG. 6 illustrates the performances of Method 2 operations as applied to liquid feed mixtures of p-xylene and m-xylene containing 80%, 85%, 90% and 95% p-xylene. Again, it shows that the drying-up temperature and drying-up pressure decrease as the impurity concentration increases. FIG. 7 compares the performances of Method 1 and Method 2 as applied to a given feed. It shows that the drying-up temperature and pressure of Method 1 (A-line) are significantly higher than those of Method 2 (B-line). It also shows that the performance of an actual parallel current operation Method 3 (C-line) falls between those of Methods 1 and 2. These figures show that when the impurity concentration in the feed is too high, direct dry distillative freezing operations may not be practical, because the drying-up temperature and pressure are too low.

FIG. 8 illustrates a flow sheet for applying a dry distillative freezing operation to a solid-liquid mixture $K_2$, containing a mass of solid $S_2$ and a mass of motor liquor $M_2$. FIG. 9 illustrates the performances of Method 1, 2 and 3 operations are used in dry distillative freezing operations of solid-liquid mixtures. It shows that the drying-up temperature is strongly related to the wetness of the feed mixture, defined as $M_2/(S_2+M_2)$ and shows that the drying-up temperature and the drying-up pressure increase appreciably as the wetness is reduced. FIG. 10 illustrates the performances of Method 2 operations as used in dry distillative freezing operations of solid-liquid mixtures with p-xylene as the major component and o-xylene, m-xylene and ethyl benzene as impurities. The figure shows that the drying-up temperature and pressure increase as the wetness and the impurity concentration decrease. Therefore, FIGS. 9 and 10 illustrate a major advantage of the wet and dry distillative freezing process, viz. raising the drying-up temperature and pressure appreciable. The major reason for the improvement is that the sensible heat released in cooling the solid phase S and the latent heat released in solidifying a part of the liquid phase together provide the latent heat needed in vaporizing the rest of the liquid phase.

FIGS. 11, 12 and 13 illustrate three ways by which feed solid-liquid mixtures $K_2$ for dry distillative freezing operations can be prepared. In FIG. 11, the $K_2$ mixture is prepared from a liquid feed F by a conventional freezing operation followed by crystal washing and separation operations; in FIG. 12, the $K_2$ mixture is prepared from a liquid feed F by a wert distillative freezing operation followed by crystal washing and separation operation; in FIG. 13, the $K_2$ mixture is prepared by adding a liquid feed to a mass of recycled refined solid $S_{3R}$.

FIG. 14 illustrates a system in which the liquid feed F is used as the wash liquid;

FIG. 15 illustrates a system in which a part of the condensate is used as the wash liquid;

FIG. 16 illustrates a system in which a part of the refined liquid product is used as the wash liquid;

FIG. 17 illustrates a system in which a liquid containing the crystallizing component and a selected volatile component is used as the wash liquid.

Figure 5:
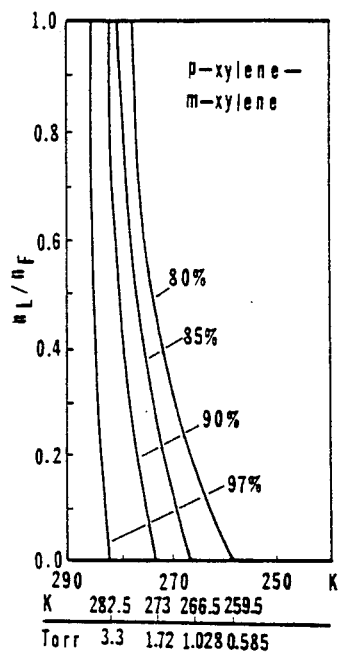

5. Mode of Carrying Out the Invention

The applicants' previous patents, U.S. Pats. Nos. 4,218,893, 4,378,984, 4,451,237 and 4,433,558 describe mostly the "basic distillative freezing process" and the "direct dry distillative freezing operations." The "wet and dry distillative freezing process" described in the present application represents a major improvement to the distillative freezing technology. The wet and dry approach has several advantages over the direct dry approach and has significantly broadened the field of application of the distillative freezing technology. In order to place the "wet and dry approach" in a proper perspective, a brief review of the "direct dry approach" is presented in Sections A-1 through A-3. The wet and dry approach is described in Sections B-1 through B-5 and equipment used are described in Section C.

5-A. The Direct Dry Distillative Freezing Process

5-A-1. Phase Diagrams and Processing Steps

A direct dry distillative freezing process applies to a liquid feed containing a volatile and crystallizing component, denoted as B-component, and one or more volatile and non-crystallizing components, denoted respectively as $A_1$, $A_2$--- $A_n$ components. Two components of the mixture processed are chosen and denoted as the key components: one is the crystallizing component and is denoted as B-component; the other is the non-crystallizing component present in the greatest amount and is denoted as A-component. For a mixture to be processable by the direct dry distillative freezing process, the mixture has to have certain characteristic phase behaviors and the vapor pressures of the key components have to meet some limitations. The required phase behaviors and vapor pressure relations are described by referring to binary systems, each having a crystallizing component and one non-crystallizing component. In the present disclosure, it is construed that the limitations presented apply to the binary mixture of the two key components of a multi-component mixture having more than one non-crystallizing components. In a direct dry distillative freezing process, a liquid feed is flash vaporized under a sufficiently reduced pressure to simultaneously crystallize the B-component and the process is continued to completely eliminate the liquid phase and bring the mixture into the two phase solid-vapor region. Then, the solid phase is no longer contaminated by an adhering liquid phase and gives a super pure product of the B-component upon melting.

In order for the process to work, the ratio of the vapor pressures of the non-crystallizing key component and crystallizing component has to be within a proper range and the low pressure phase diagram of the system has to have certain characteristic features. These features are explained by referring to phase diagrams of binary systems to which the process can be applied. FIG. 1 illustrates a low pressure phase diagram of a Type 1 system in which the volatility of the crystallizing component ($\alpha_A$) is higher than that of the non-crystallizing key component ($\alpha_B$); FIG. 2 illustrates a similar diagram for a Type 2 system in which the volatility of the crystallizing component is less than that of the non-crystallizing key component. The characteristic features that are common in these diagrams are that there is a three phase (B-solid, liquid, vapor) temperature 1-2-3 (denoted as B-L-V temperature), and there is a two phase (B-solid,vapor) region 1-3-4 (denoted as B-V region) and a two phase (B-solid, liquid) region 1-2-5-6 (denoted as B-L region) above and below the three phase B-L-V temperature respectively. It is noted that liquid-vapor regions 2-3-7 are respectively above and below the B-L-V temperatures in these systems. A guide in determining the feasibilty is that the two key components form a binary system, (a) whose characteristic vapor pressure ratio defined as the ratio of the vapor pressure of A-component to that of of B-component both evaluated at the triple point temperature of B-component is in the range of 0.1 to 10, and is lower than the ratio of the latent heat of sublimation and the latent heat of melting of the B-component evaluated at the triple point of the B-component, and (b) whose constant pressure phase diagram taken at a three phase (B-enriched solid, liquid and vapor) pressure has a two phase (B-enriched solid and vapor) region covering a substantial concentration range above the three-phase (B-enriched solid, liquid and vapor) temperature and a two phase (B-enriched solid and liquid) region below the three phase (B-enriched solid, liquid and vapor) temperature.

Processing of a Type 1 mixture comprises the following four steps:

(1) Step 1: Direct Dry Distillative Freezing Operation

This step is mostly a three phase transformation by which the feed is partially vaporized and solidified and the operation is continued until the liquid phase is completely eliminated. A mass of purified B-solid and a first vapor are produced in this operation.

(2) Step 2: Melting of Purified B-solid

In this step, the purified B-solid obtained in Step 1 is melted to give a very pure B-product.

(3) Step 3: Condensation into Solid and Liquid Masses

In this step, the first step vapor is cooled without being substantially pressurized and is transformed into a solid condensate and a liquid condensate. Some of the solid formed may adhere to the condenser surface.

(4) Step 4: Melting of Solid Condensate or Adhering Solid

In this step, the solid condensate or adhering solid obtained in Step 3 is melted. The condensates are transformed into a liquid mixture which constitutes a B-lean product.

Let the vapor formed in Step 1 be represented by point 3 in FIG. 1, and let the vapor be cooled to a temperature represented by line 10-8-9. It condenses completely and the condensed mass is represented by point 8 that is within the two phase solid-liquid region 1-2-5-6. Therefore, the condensed mass has a mass of B-solid phase 9 and a mass of liquid phase 10 in the ratio of 10-8/9-8. However, when the vapor is compressed first before being cooled, the compressed vapor can be condensed entirely into a liquid mass. In this way, Step 3 becomes a simple condensation step and Step 4 is eliminated.

When a Type 2 mixture is processed and a large Δt for heat transfer is used in condensing the first vapor, the condensed mass is also represented by a point 12a within the two phase solid-liquid region. Therefore, the condensed mass also contains a mass of solid 12b and a mass of liquid 12c in the ratio of 12c-12a/12b-12a. Therefore, the four step operational procedures described above apply also. However, when a proper condensing temperature is used, the condensed mass is represented by a point with the region 11-12, and the condensed mass is entirely in a liquid phase. Then, Step 3 becomes a simple condensation step and Step 4 is eliminated. Similar to what has been described, the first vapor may also be compressed before the condensation step to avoid forming a solid phase in the condensed mass. The first vapor may also be compressed and simply be discharged from the system.

5-A-2. The Direct Dry Distillative Freezing Operation and Its Drying-Up Temperature and Pressure There are two idealized methods of conducting the direct dry distillative freezing operation. These are:
(a) Ideal Parallel Contact Distillative Freezing (method 1)
(b) Ideal Differential Vapor Discharge Distillative Freezing (method 2)

These methods are illustrated by FIGS. 3-a and 3-b respectively. The first method is conducted within an extended processing zone, wherein feed is introduced at one end and the purified B-solid and the low pressure vapor are both discharged at the other end. Pressure decreases from the feed end to the discharge end, the pressure distribution being maintained by the flow of low pressure vapor. The vapor and solid formed and the liquid that remains are all transferred in the same direction and the vapor is allowed to interact with the liquid constantly as the vaporization and solidification take place. In the second method, vapor is removed from the processing zone as it is formed and therefore is not allowed to interact with the liquid down stream. The first method definitely has advantages over the second method. The second method, however, may be used to process a dilute mixture.

By applying material balance, energy balance, and equilibrium relations, one can relate amounts of liquid, solid and vapor as functions of pressure in these methods. FIG. 4-a shows that when one mole of feed containing 10% m-xylene is processed by the first method, the liquid mass becomes zero at 1.272 torr and 268.6 K (14.4 C), and 0.73 mole of purified p-xylene vapor discharged; all the vapor is discharged at a uniform composition of 36% m-xylene. In contrast, FIG. 4-b shows that when the second method is used, the liquid ass becomes zero at 0.053 torr and 234 K (−39 C), which are considerably lower than those of the first method. The mass of purified p-xylene solid is 0.68 moles which is less than that of the first method. All the m-xylene goes into the 0.32 mole of the low pressure vapor and the composition of the discharged vapor ranges from about 10% at the beginning to about 76% at the end. The temperature and pressure at which the liquid mass becomes zero are referred to as drying-up temperature and drying-up pressure respectively.

Figure 6:
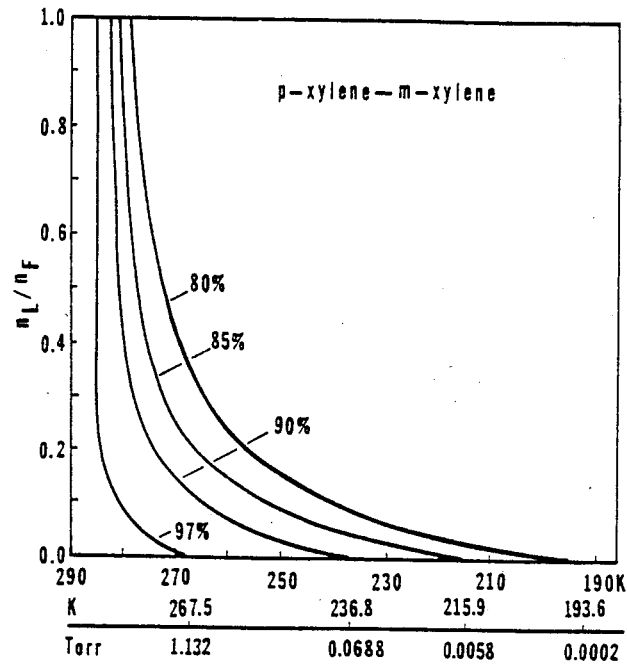

Results obtained in studying the performances of processing mixtures of p-xylene and m-xylene with 97%, 90%, 85% and 80% p-xylene by the tow methods are shown in FIGS. 5 and 6. In these figures, mole of liquid remaining per mole of liquid feed is plotted against the temperature of a point in the processing zone. FIG. 5 showss that the drying-up temperatures and pressures for processing 97%, 90%, 85% and 80% p-xylene feeds by method 1 are respectively (282.5 K, 3.3 torr), (273 K, 1.72 torr), (266.5 K, 1.028 torr) and (259.5 K, 0.585 torr). FIG. 6 shows that the drying-up temperatures and pressures for processing 97%, 90%, 85% and 80% feeds by method 2 are respectively (267.5K, 1.132 torr), (236.8 K, 0.688 torr) (215.9 K, 0.0058 torr) and (193.6 K, 0.0002 torr) presented. One can draw the following conclusions:

(1) The yield of purified B-solid in method 1 is significantly higher than that of method 2.
(2) The drying-up pressure is considerably higher in method 1.
(3) The drying-up temperature is considerably higher in method 1.

(4) The drying-up temperature and pressure decrease rapidly as the impurity concentration in the feed mixture increases.

Figure 7:
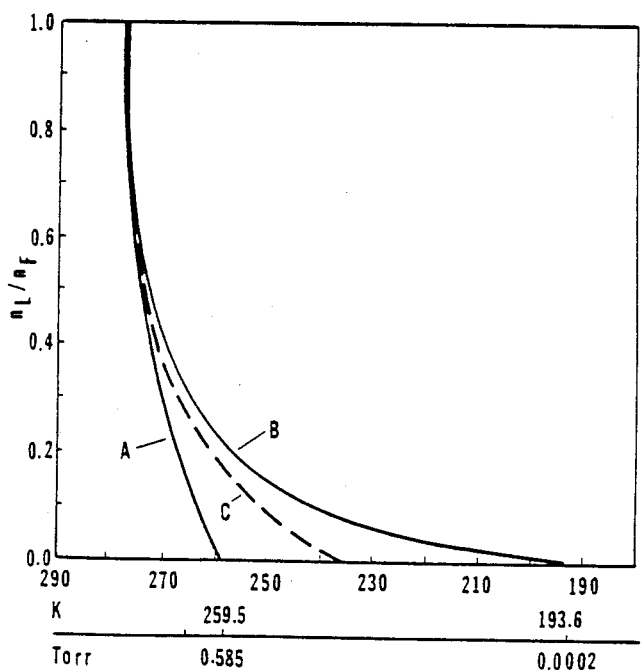

The performance of a practical parallel contact distillative freezing process (method 3) tends to deviate from an ideal operation due to insufficient contact between vapor and liquid. Line C in FIG. 7 illustrates the performance of an actual parallel contact process. Improvements in design and operations will bring Line C closer to Line A.

Normally, a chemical engineer will expect that a a counter-current operation is better than a parallel current operation: a counter-current heat exchange is better than a co-current heat exchange; a counter-current gas absorption is preferred over a co-current gas absorption; a counter-current extraction is superior to a co-current extraction. However, in the distillative freezing process, the parallel contact distillative freezing operation is the superior operation.

5-A-3. Limitations to the Direct Dry Distillative Freezing Operations

There are two major limitations to the direct dry distillative freezing operations. These are:
(1) There are practical limits to the level of impurities in the feed that can be processed by each method.
(2) A low volatility impurity in the feed cannot be removed by the direct dry approach.

The reasons for the first limitation are as follows: The results presented in the preceeding section show that drying-up temperature and drying-up pressure decrease rapidly as the impurity concentration increases. The rates of conducting the processing steps decrease as the processing temperature and pressure decrease. Therefore, the equipment cost and operation cost increase as the impurity concentration increases. The degree of operational difficulty increases as the operation pressure decreases also. The reason for the second limitation is that a low volatility impurity does not vaporize and remains with the B-solid phase and appears in the refined product.

5-B. The Wet and Dry Distillative Freezing Process

5-B-1. Introduction

It has been described that the wet and dry distillative freezing process has greatly expanded the field of application of the distillative freezing technology. It has major advantages over the direct dry distillative freezing process. It can handle a rather concentrated solution: it can remove a major fraction of a low volatility impurity in the feed; the drying-up pressure and temperature of the wet and dry process are much higher than those of the direct dry process.

A wet and dry distillative freezing process comprises a wet sub-process and a dry distillative freezing sub-process. The wet sub-process is a preparation step in which a major amount of B-crystals are formed and the dry subprocess is a final purification step. Several ways of conducting a wet sub-process will be described. Usually, a wet sub-process comprises a fractional solidification step (Step 1) and a crystal washing and draining step (Step 2) and produces a solid-liquid mixture, denoted as $K_2$ mixture, that consists of a solid phase mass $S_2$ and a liquid phase mass $M_2$, from the original feed. A solid recycle process may be used to produce $K_2$ mixture. The dry sub-process is a dry distillative freezing subprocess in which the $K_2$ mixture is subjected to a distillative freezing crystal drying operation and produces a refined mass of B-crystals. As an example, the original liquid feed may be frozen to form a solid-liquid mixture $K_1$ (Step 1), and the $K_2$ mixture may be washed with various wash liquids and then drained to form the $K_2$ mixture (Step 2). Therefore, the impurities contained in the mother liquor of $K_2$ mixture may be substantially different from the impurities contained in the mother liquor of the $K_1$ mixture. For example, a low volatility impurity in the original feed and in the $K_1$ mixture may be removed in the washing step. The $K_2$ mixture contains a mass of B-solid and a mass of mother liquor, denoted as $M_2$. The mother liquor $M_2$ contains a volatile and crystallizing component and one or more volatile and non-crystallizing components. The crystallizing component, denoted as B-component, and the non-crystallizing component existing in the highest amount, denoted as A-component, are called the two key components in the wet and dry process.

The $K_2$ mixture is to be subjected to a dry distillative freezing operation. In order for the dry distillative freezing operation to work, the ratio of the vapor pressure of the key non-crystallizing component to that of the crystallizing component in the $K_2$ mixture has to be within a proper range and the low pressure phase diagram of the binary system of the two key components has to have certain characteristic features. These limitations and the characteristic features are the same as those described in Section A-1 in connection with the direct dry process. The guide given in Section A-1 applies here also.

5-B-2. The Dry Distillative Freezing Sub-Process

FIG. 8 illustrates a flow sheet of subjecting a $K_2$ mixture to a dry distillative freezing sub-process. Since the wet sub-process proceeds the dry sub-process and since there are usually two processing steps in the wet sub-process, the first step of the dry sub-process is denoted as Step 3. When the two key components in the $K_2$ mixture form a Type 1 binary system illustrated in FIG. 1, the $K_2$ mixture is subjected to the following four steps:

Step 3 Dry Distillative Freezing Operation

The feed solid-liquid mixture $K_2$ containing the solid phase mass $S_2$ and the liquid phase mass $M_2$ is introduced into a dry distillative freezer (3), wherein the liquid phase is simultaneously vaporized and solidified in a way similar to the direct dry distillative freezing operation to yield a mass of refined B-solid, denoted as $S_3$, and a mass of vapor $V_3$ containing most of the impurities.

Step 4 Condensation into Solid and Liquid Masses

In this step, the low pressure vapor obtained in Step 3 is cooled without a substantial pressurization in a condenserdesublimer (4). The condensate is a solid-liquid mixture, denoted as $K_4$ mixture.

Step 5 Slush Melting

In this step, the solid phase mass in the $K_4$ mixture is melted in a slush melter (5) to become a liquid mass, denoted as $L_5$, that contains substantially all of the impurities in the $K_2$ mixture.

Step 6 Melting of Purified B-solid

In this step, the refined B-solid $S_3$ obtained in Step 3 is melted in the crystal melter (6) and becomes a refined B-liquid $L_6$.

One may modify the process by first compressing the low pressure vapor obtained in the third step and subject the compressed vapor to a simple condensation operation forming a liquid condensate directly. Then, Step 4 can be eliminated. In some cases, such as in processing a mixture in which the triple point pressure of the B-component is high, one may simply compress and discharge the vapor formed in the third step from the system.

When the key components in the $K_2$ mixture form a Type 2 binary system, the condensate formed in Step 4 may either be a simple liquid condensate or a mixture of liquid condensate and solid condensate depending on the condenser temperature used. Therefore, the process may be a four step operation described or a three step operation eliminating the fourth step. Again, the vapor may be first compressed, and the compressed vapor may be subjected to a simple condensation operation or simply be discharged from the system.

5-B-3. The Performance of a Dry Distillative Freezing Operation

Theoretical analyses similar to those described in the direct dry approach have been used to determine the drying-up temperatures and drying-up pressures when an ideal parallel contact operation (method 1) and an ideal differential vapor discharge operation (method 2) are applied to a wet cake (solid-liquid mixture) $K_2$ that contains $S_2$ lb. of p-xylene and $M_2$ lb. of mother liquor. Lines A and B in FIG. 9 summarize the results obtained when the mother liquor contains 85% p-xylene and 15% m-xylene. In the figure, the x-axis represents the drying-up temperature in decreasing sequence and the y-axis represents the wetness of $K_2$ mixture, defined as $M_2/(S_2+M_2)$. Temperatures at points $f_1, f_2, ----, f_9$ and $f_{10}$ on A-line are the drying-up temperatures when an ideal parallel contact approach (Method 1) is applied to feed cakes whose wetnesses are 0.1, 0.2, ----, 0.9 and 1.0 respectively; temperatures at points $f_1', f_2', ----, f_9'$ and $f_{10}'$ on B-line are the drying-up temperatures when differential vapor discharge approach (Method 2) is applied to feed cakes whose wetnesses ae 0.1, 0.2, ---, 0.9 and 1.0 respectively; temperatures at $f_1'', f_2'', ----, f_9''$ and $f_{10}''$ on C-line are the drying-up temperatures when an actual parallel contact approach (method 3) is applied to feed cakes whose wetnesses are 0.1, 0.2, ----, 0.9 and 1.0 respectively. It is noted that C-line lies between A-line and B-line. Obviously, it is desirable to operate method 3 in such a way that C-line comes close to A-line. It is important to note that in each method, the drying-up temperature is strongly affected by the wetness of the cake: the lower the wetness is, the higher is the drying-up temperature, and consequently, the higher is the drying-up pressure. It is noted that the drying-up temperatures at wetness =1.0 are the drying-up temperatures for the direct dry operations. It is important to note that the drying-up temperature and pressure of a relatively dry cake by each method are significantly higher than those of the direct dry operation by the same method. Therefore, it is desirable to prepare a relatively dry $K_2$ mixture and subject the $K_2$ mixture to a dry distillative freezing operation.

More extensive computations have been made for the differential vapor discharge method (method 2) and the results are shown in FIG. 10. The results presented serve as conservative estimations of the drying-up temperatures and drying-up pressures in practical operations. The results presented in FIG. 10 are for a quaternary system with a mass of p-xylene as the crystallizing component and masses of ethyl benzene, m-xylene and o-xylene in the ratio of 1:3:1 as the impurities. The quaternary system is the system dealt with in the p-xylene industry. It is noted that in this system, the two key components are p-xylene (B-component) and m-xylene (A-component). In the figure, a'-line through j'-line respectively show the performances of the differential vapor discharge operations applied to $K_2$ solid-liquid mixtures whose mother liquors contain 99%, 98%, 97%, 95%, 90%, 85%, 80%, 75%, 70% and 65% p-xylene respectively. Knowing the composition of the mother liquor in the $K_2$ solid-liquid mixture and the wetness of the mixture, one can find the drying-up temperature. There is a $P=f(T)$ curve in the figure. The line relates the drying-up temperature (X-axis) to the drying-up pressure (in torrs on the right hand Y-axis). It is again noted that when the wetness of the $K_2$ mixture is 1, the mixture actually is completely in the liquid state and the distillative freezing operation is actually a direct dry operation. Therefore, the points on wetness =1 line provide information about direct dry operations.

The wetness of the $K_2$ solid-liquid mixture is the most important operating variable in the wet and dry approach: The wetness determines the operating temperature and pressure in the dry distillative freezing step and also determines the product purity. It is noted that the vaporization rate and the condensation rate decrease as the operating pressure decreases. Furthermore, the energy input required for heat pumping between the condenser temperature and the melter temperature increases as the operating temperature at the dry distillative freezing step decreases. Therefore, both the equipment cost and operating cost increase as the drying-up temperature and drying-up pressure decrease. Therefore, it is desirable to reduce the wetness of the $K_2$ mixture to as low a value as practicable. However, one has to choose a practical way of reducing the wetness, and properly integrate the equipment used in the overall system. In making some of the claims, it is convenient to refer to an upper bound wetness. It is observed that the differences in drying-up temperatures and drying-up pressures are very significant between $K_2$ mixtures with wetnesses of 0.5 and 1.0. Since it generally not difficult to obtain a $K_2$ mixture with wetness of 0.5, this wetness may be taken as the upper bound wetness in the wet and dry approach. When the crystal size is relatively large, the wetness can be reduced to less than 30% by a simple deep bed draining and to less than 10% by a low rpm centrifuge.

The following important conclusions can be drawn from the results presented:

1. The first major advantage of the wet and dry approach is that the drying-up temperature and pressure can be much higher than those of the direct dry approach. This advantage can be enhanced by first forming $K_2$ mixture that has a low degree of wetness and the mother liquor contained therein has a low concentration of impurities.
2. The wet and dry approach can handle a feed with a higher concentration of impurities than the direct dry approach.

3. The wet and dry approach can remove a major fraction of low volatility solutes and non-volatile solutes.

5-B-4. Methods of Preparing $K_2$ Mixtures

Figure 11:
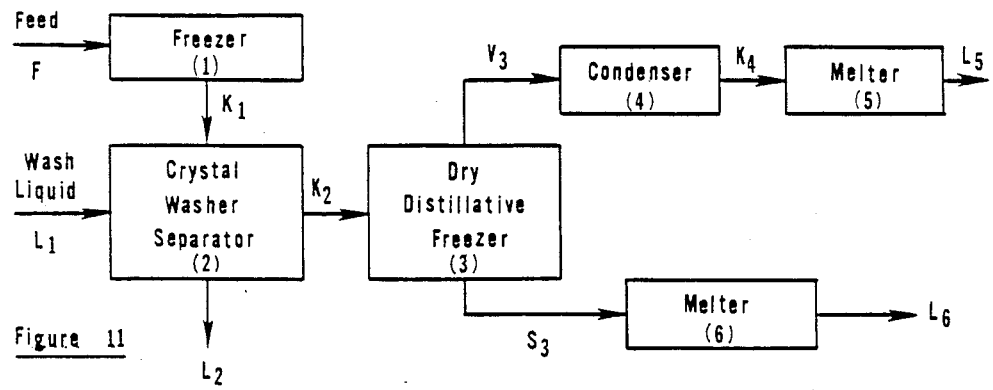
Figure 12:
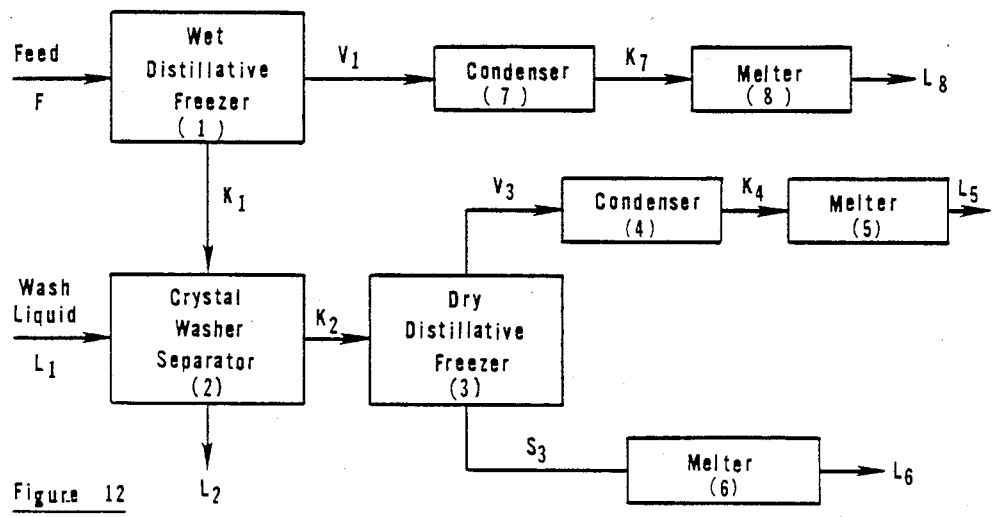

FIGS. 11 and 12 show two ways by which $K_2$ mixtures can be prepared from original liquid feeds. In FIG. 11, a liquid feed F is introduced into a conventional freezer (1) and is partially frozen and becomes a solid-liquid mixture $K_1$ containing a solid mass $S_1$ and a mother liquor $M_1$. The $K_1$ mixture is washed with a wash liquid $L_1$ and a mother liquor $L_2$ is separated from the mixture in a crystal washer-separator (2) to give a $K_2$ mixture. The $K_2$ mixture is then subjected to the four step processing described in Section B-2. In FIG. 12, a liquid feed F is subjected to a wet distillative freezing operation in a wet distillative freezer (1) to give a low pressure vapor $V_1$ and a solid-liquid mixture $K_1$. The $K_1$ mixture is washed with a wash liquid $L_1$ and a mother liquor is separated from the mixture in a crystal washer-separator (2) to give a $K_2$ mixture. The $K_2$ mixture is then subjected to the processing steps described in Section B-2. The low pressure vapor $V_1$ is condensed and transformed into a liquid mass $L_8$ in a condenser (7) and a condensate melter (8). Various wash liquids can be used in washing the crystals and these will be described in Section B-5 by referring to FIGS. 14 through 17.

Figure 13:
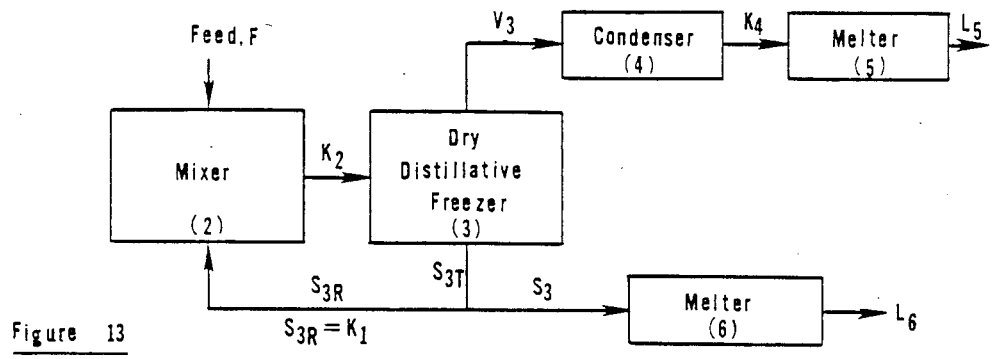

FIG. 13 illustrates the so-called "Solid Recycle Distillative Freezing Process" in which $K_2$ mixture is prepared by mixing a feed liquid F with a mass of recycled refined solid $S_{3R}$ to be described to form a $K_2$ mixture in a mixer (2). The $K_2$ mixture is then subjected to a dry distillative freezing operation in a dry distillative freezer (3) to give a low pressure vapor $V_3$ and a mass of refined B-solid. A part of the refined solid $S_{3R}$ is recycled to the mixer and the remainder $S_3$ is melted in the melter (6) to become a refined B-liquid $L_6$. The low pressure vapor is condensed and transformed into an impure liquid $L_5$. The solid-recycle approach has advantages over the direct dry approach in that the drying-up temperature and drying-up pressure are raised substantially. It is noted that the solid phase circulated between the freezer (3) and the mixer (2) alternately becomes a heat source and a heat sink. In the distillative freezer, the solid phase temperature goes down, releasing sensible heat which is utilized in vaporizing some of the liquid phase; in the mixer, the solid phase temperature goes up, picking up sensible heat to cause some feed liquid to freeze.

FIGS. 11, 12 and 13 illustrate several versions of the wet and dry distillative freezing process. Each of these processes have the following common steps:

Step 1: In this step, a feed is partially solidified to form a condensed mass, denoted as the first step condensed mass $K_1$, that has a mass of B-enriched solid phase. In the process illustrated by FIG. 11, the feed is partially solidified in the freezer to form a solidliquid mixture; in the process illustrated by FIG. 12, the feed is subjected to a wet distillative freezing operation to form a solid-liquid mixture. In the process illustrated by FIG. 13, a mass of refined B-solid, $S_{3T}$, is formed from the feed in the second step and third step to be described, and a part of it becomes a recycled solid $S_{3R}$. The recycled solid $S_{3R}$ becomes a condensed mass $K_1$ to be brought in contact with the feed in the second step. Therefore, in the "Solid-Recycle Distillative Freezing Process," the combination of Step 2 and Step 3 becomes the first step in which a condensed mass $K_1$ is formed from the feed.

Step 2: In this step, the first step condensed mass is brought in contact with a liquid mass to form a second step condensed mass $K_2$. In the processes of FIGS. 11 and 12, $K_1$ mixture is washed by a wash liquid $L_1$ and drained to form $K_2$; in the process of FIG. 13, the recycled solid $S_{3R}$ becomes $K_1$ and is brought in contact with feed to form K -mixture.

Step 3: In this step, $K_2$ mixture is subjected to a dry distillative freezing operation to form a mass of refined B-solid and a vapor mass.

These features will be used as the unifying features of these versions of the wet and dry distillative freezing process.

5-B-5. Wash Liquids Used in the Wet and Dry Approach

Various wash liquids may be used to wash a $K_1$ solid-liquid mixture and transform it into a $K_2$ solid-liquid mixture. The major objectives to be accomplished in a crystal washing and separation operation are to prepare a $K_2$ mixture that has the following characteristics:
(1) The $K_2$ mixture has a low degree of wetness.
(2) The $K_2$ mixture may contain volatile non-crystallizing components, but the total impurity concentration should not be high.
(3) The amount of a low volatility impurity in the $K_2$ mixture should be low.

The wash liquid used does not have to be a pure B-component liquid; it may contain one or more volatile impurities. In contrast, it is noted that in a conventional fractional solidification process, a pure B-component is normally used as the wash liquid. An impurity in the wash liquid may or may not be one of the impurities in the original feed. Even though it is possible to use a wash liquid from any source, it is convenient that the wash liquid used be readily available within the same plant or from a nearby plant. Again, the wash liquid used should contain the B-component as the major component and may contain one or more volatile impurities. The reason that one or more volatile impurities are allowed to be in the wash liquor is that these impurities will be taken up in the $K_2$ mixture and will be removed as constituents of $V_3$ vapor in the dry distillative freezing step.

The total concentration of the impurities in a wash liquid used may vary. It is noted that when the total impurity concentration in the wash liquid is lower than that in the mother liquid $M_1$ in the $K_1$ mixture, an additional amount of crystals will form during the crystal washing operation, and in the reverse case, some crystals will melt. Some dissolution of crystals or formation of crystals may be tolerated in a crystal washing step. However, it is desirable to avoid an excessive crystal formation and an excessive crystal dissolution: an excessive crystal formation may cause a packed bed to plug up and an excessive crystal dissolution means a product loss.

Figure 14:
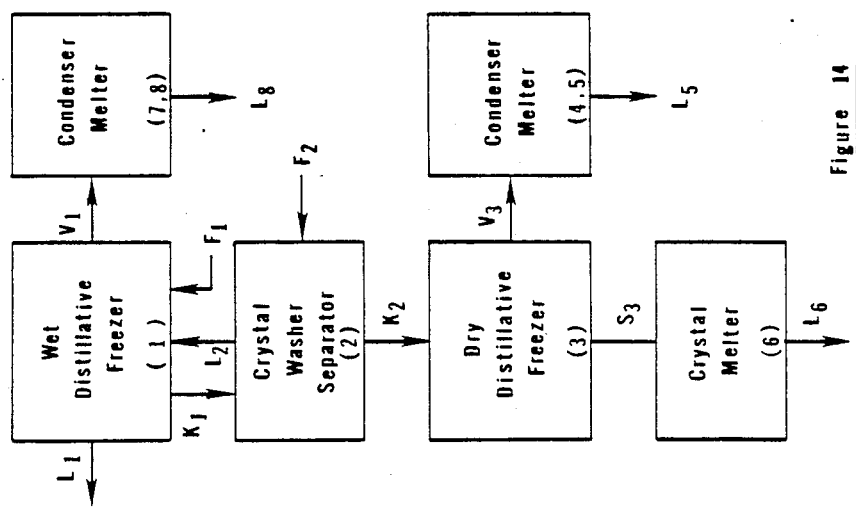

A convenient wash liquid to use is the feed itself. FIG. 14 illustrates such an operation. It shows that a recycled liquid $L_2$ and a part of the feed liquid $F_1$ are fed into a freezer such as a wet distillative freezer (1) to thereby form a $K_1$ solid-liquid mixture, a product impure liquid $L_1$ and a low pressure vapor $V_1$. The low pressure vapor is condensed and transformed into an impure condensate liquid $L_8$ in a condenser-melter (7,8). The $K_1$ solidliquid mixture is washed by a part of the feed liquid $F_2$ and the resulting mixture is separated into $K_2$ solid-liquid mixture and a recycled liquid $L_2$. As has been described, the recycled liquid $L_2$ is introduced into the freezer. $F_1/F_2$ ratio may be varied: the amount needed for an effective washing is taken as wash liquid $F_2$ and the rest $F_1$ is added directly to the freezer. One may also use the entire feed as wash liquid, then $F_1=0$. The resulting $K_2$ mixture is processed by the processing steps described earlier. Due to the freezing operation, the total impurity concentration in the mother liquor ($M_1$) of $K_1$ mixture is considerably higher than that in the feed. By the feed washing operation, the total impurity concentration in the mother liquor of $K_2$ mixture is brought close to that of the feed. Therefore, the drying-up pressure and temperature are raised. When the feed contains a low volatility impurity, a major fraction of it can be removed in the $L_1$ stream. Some of the impurity will appear in the refined product.

Figure 15:
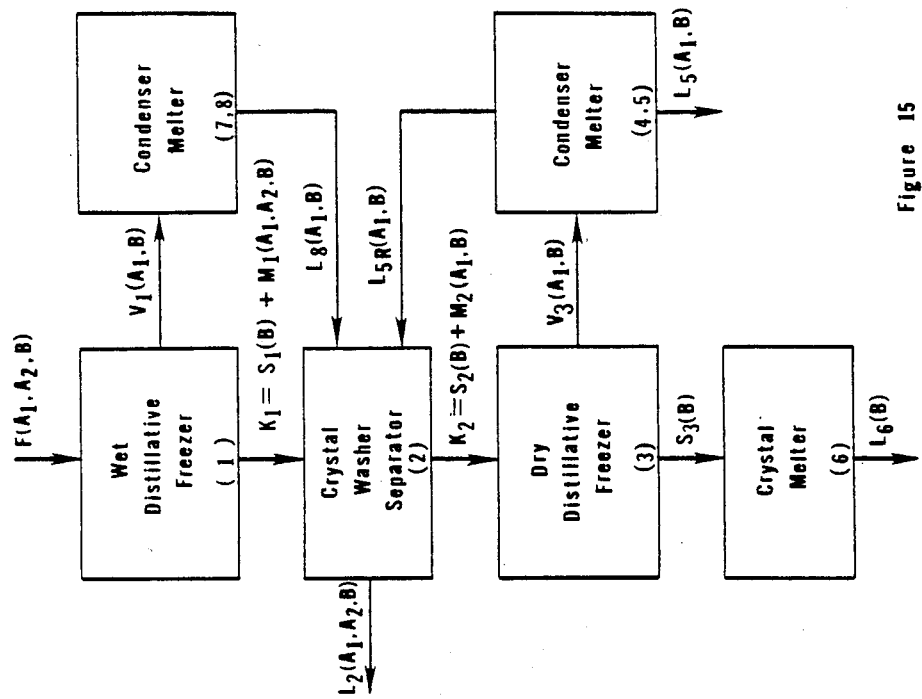
FIGS. 14 through 17 illustrate process flow sheets when various liquids are used as the wash liquids.

One may use at least a part of the condensate stream(s) as the wash liquid. FIG. 15 illustrates such a system. This is an ideal system to use when the original feed contains one or more low volatility impurities and the levels of low volatility impurities tolerated in the refined product are low. Let's assume that the feed F contains components B, $A_1$ and $A_2$, wherein B is the volatile and crystallizing component, $A_1$ is a volatile non-crystallizing component and $A_2$ is a low volatility non-crystallizing component. It is desired to produce a refined B-liquid that contains only very low levels of $A_1$ and $A_2$. Feed is flash vaporized in a wet distillative freezer to thereby form a low pressure vapor $V_1$ and a solidliquid mixture $K_1$. $K_1$ has $S_1$ and $M_1$, and $M_1$ contains $A_1$, $A_2$ and B. Assuming $A_2$ is highly non-volatile, $V_1$ contains only $A_1$ and B. $V_1$ is condensed and transformed into a condensate $L_8$, which also contains $A_1$ and B. There is a recycled condensate stream $L_{5R}$ to be described, which also contains only $A_1$ and B. In the crystal washer-separator (2), the $K_1$ mixture is washed by $L_8$ and/or $L_{5R}$ and produces $K_2(K_2=S_2+M_2)$ and $L_2$. The mother liquor in $K_2$ contains only $A_1$ and B, and substantially all of the $A_2$ component is removed as a component in $L_2$. $K_2$ is then subjected to a dry distillative freezing operation to give $S_3$ and $V_3$. $S_3$ is melted to become a refined B-product $L_6$. $V_3$ contains only $A_1$ and B; it is condensed and transformed into a condensed mass. A part or all of the condensate $L_{5R}$ is recycled to the crystal washing operation and the rest is discharged as $L_5$. In this way, substantially all of the low-volatility impurity $A_2$ is discharged as a component in $L_2$ and the refined B-product $L_6$ contains low levels of $A_1$ and $A_2$. The descriptions given above are for an ideal operation in which $A_2$ is completely non-volatile. When $A_2$ has some volatility, it will appear in low concentrations in $L_8$ and $L_{5R}$. Still a major fraction of $A_2$ will be discharged as a component in $L_2$ and the concentration of $A_2$ in $L_6$ will be low.

Figure 16:
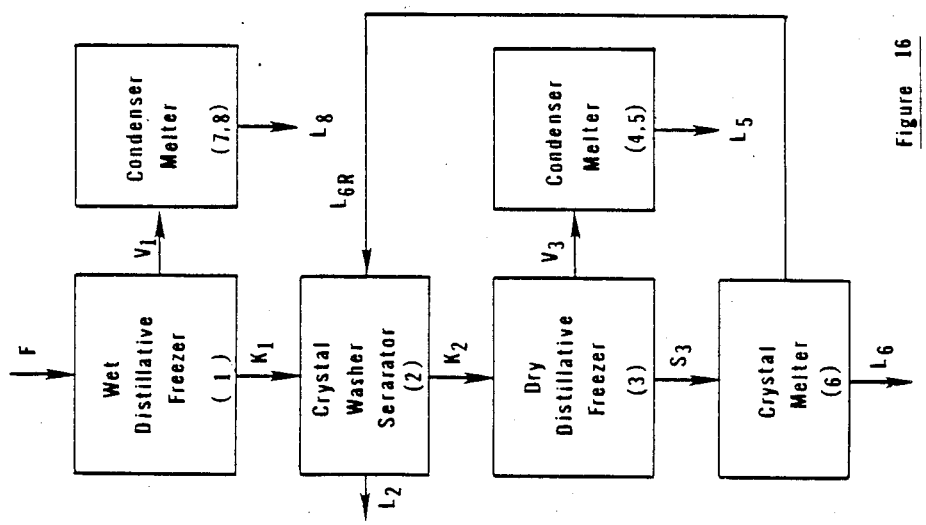

FIG. 16 illustrates a system in which a part $L_{6R}$ of the refined product obtained is recycled and used to wash the $K_1$ solid-liquid mixture. A major fraction of a low volatility impurity in $K_1$ can be displaced and discharged as a component in the discharged liquid $L_2$. Therefore, it is possible to produce a refined product $L_6$ containing a low level of the low volatility impurity. The product yield is lower because a part of the refined product is used as wash liquid. An elaborate crystal washing operation has to be used in order not to waste the precious refined liquid used as the wash liquid. Other operations in this system are similar to those described earlier.

Figure 17:
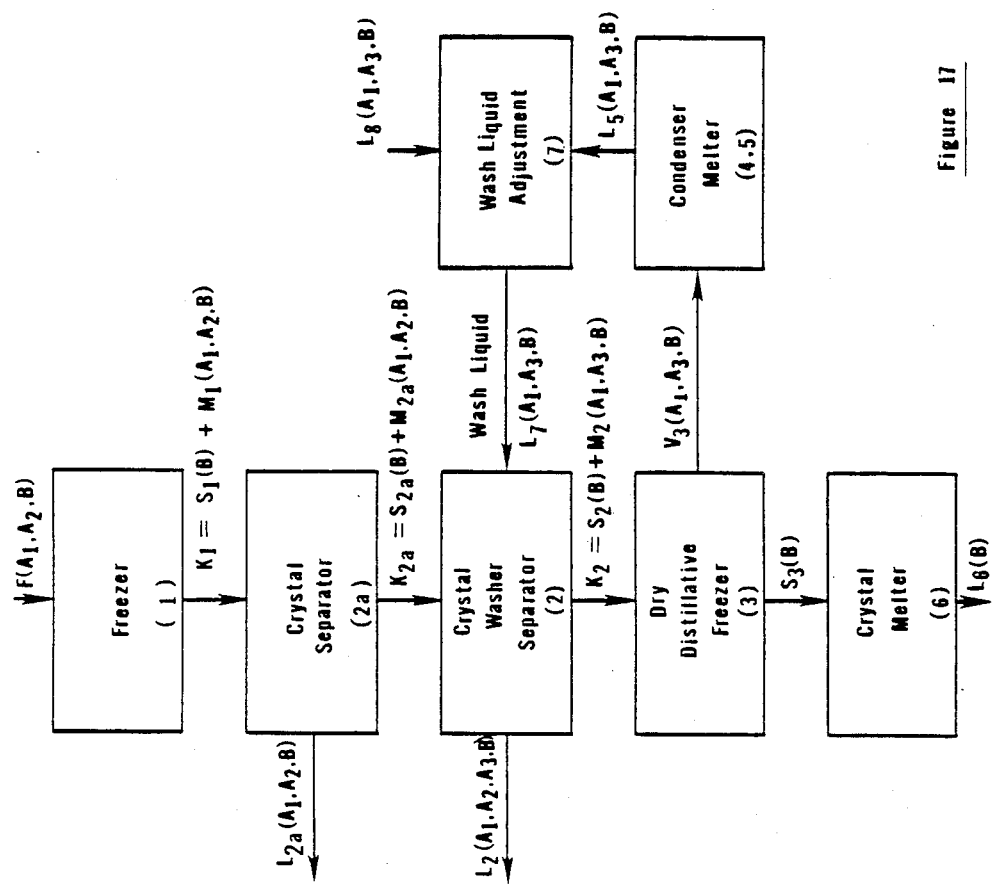

It has been described that a wash liquid used does not have to be a pure B-liquid but may contain one or more volatile non-crystallizing components. Each of these non-crystallizing components may or may not be a component in the original feed. In the system of FIG. 17, the feed contains a volatile crystallizing component B, a volatile non-crystallizing component $A_1$ and a non-volatile impurity $A_2$. The wash liquid $L_7$ used contains the crystallizing component B and two volatile non-crystallizing components $A_1$ and $A_3$, $A_3$ being not a component in the feed. By using $L_7$ containing $A_1$, $A_3$ and B to wash the $K_1$ mixture, one can obtain $K_2$ mixture having $S_2(B)$ and $M_2(A_1, A_3, B)$. Substantially all of the non-volatile impurity $A_2$ becomes a component of a displaced liquid $L_2$. $K_2$ mixture is then subjected to a dry distillative freezing operation to yield $S_3(B)$ and $V_3(A_1, A_3, B)$. On melting, $S_3(B)$ becomes a refined B liquid $L_6$ that contains a low level of $A_2$. The low pressure vapor $V_3(A_1, A_3, B)$ is transformed into a liquid mass $L_5(A_1, A_3, B)$ to which some fresh wash liquid $L_8(A_1, A_3, B)$ is added to become the wash liquid $L_7(A_1, A_3, B)$. One may simply use a mixture of B and $A_3$ as a wash liquid without using the condensate. Other operations in the figure are similar to those described earlier.

The wash liquids used may be classified into two groups, viz. product and non-product. When a part of the refined product is used as the wash liquid, the amount of wash liquid used has to be limited. Therefore, an elaborate washing equipment has to be used and it is more difficult to attain the degree of washing desired. In contrast, when a non-product such as the feed and condensate is used, there is a large amount of wash liquid available. Therefore, a simple equipment can be used for the washing operation and it is easier to attain the degree of washing desired.

5-C. Equipment

Figure 18:
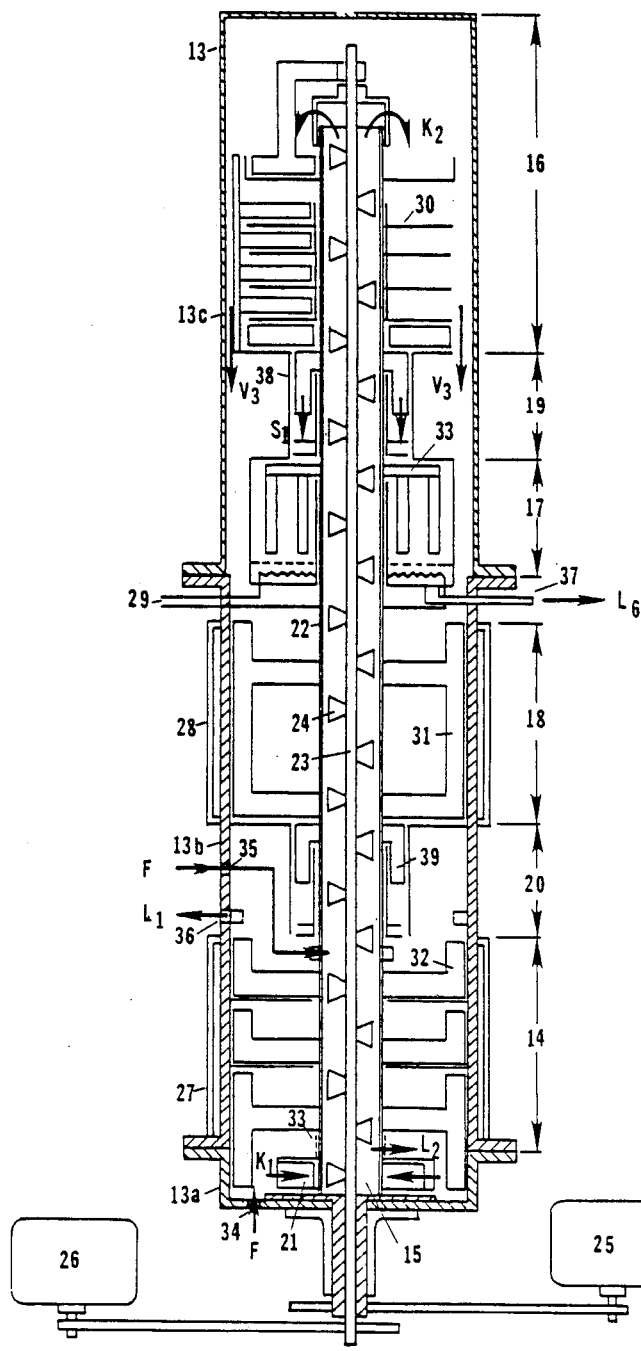
FIG. 18 illustrates an equipment in which the system of FIG. 11 can be conducted.

FIG. 18 illustrated a system in which a wet and dry distillative freezing process, illustrates by FIG. 11, can be conducted. It has a vacuum enclosure 13 that comprises a lower cover 13a, a lower section 13b and an upper section 13c. The unit has a doublejacketed scraped surface freezing zone 14, a crystal lifting and draining zone 15, a dry distillative freezing zone 16, a crystal melting zone 17, a scraped surface condensing zone 18 and two transfer zone 19,20. In the crystal lifting zone, there are a slurry pump 21, a rotating tube 22 and a rotating shaft 23 with crystal lifting blades 24. The rotating tube and the rotating shaft are rotated separately by two motors 25, 26. A part of the feed may be used to wash the crystals. A zone below the freezing zone (not shown in the figure) or a lower section within the rotating tube may be used as a crystal washing zone. There are double-jacketed heat exchangers 27, 28 in the freezing and condensing zones and there is a heater or a heating coil 29 in the crystal melter. There are rotating disks 30 in the dry distillative freezing zones. There are rotating scrapers 31, 32 in the condensing and freezing zones and rotating arms 33 in the crystal melting zone. The rotating disks, rotating arms and rotating scrapers are attached to the rotating tube 22. There are a feed inlet port 34 or 35, an impure product discharge port 36, and a refined discharge port 37.

Feed is partially frozen to become a solid-liquid mixture $K_1$ and an impure liquid $L_1$. The impure liquid is discharged from the discharge port 36. The $K_1$ mixture is pumped by the slurry pump 21 into the crystal draining zone within the rotating tube. $K_1$ mixture is drained to become a mother liquor $L_2$ and a solid-liquid mixture $K_2$. The mother liquor flows back into the freezer through the screen 33, and $K_2$ mixture is discharged from the top of the rotating tube. Draining is accomplished by lifting the crystals by the lifting blades. As the $K_2$ mixture falls downward through the rotating disks, the liquid phase is subjected to a dry distillative freezing operation. $K_2$ mixture is thereby transformed into a mass of refined solid $S_3$ and a low pressure vapor $V_3$. The refined solid $S_3$ is transferred through a first pressure isolating transfer mechanism 38 and into the melter. The melt $L_6$ is the refined product and is discharged through the product discharge port 37. The low pressure vapor $V_3$ flows downward and enters the condenser and is condensed therein to become a solid-liquid mixture $K_4$. The $K_4$ mixture is transferred into the freezing zone. Therefore, the feed F is transformed into a refined product $L_6$ and an impure product $L_1$.

Figure 19:
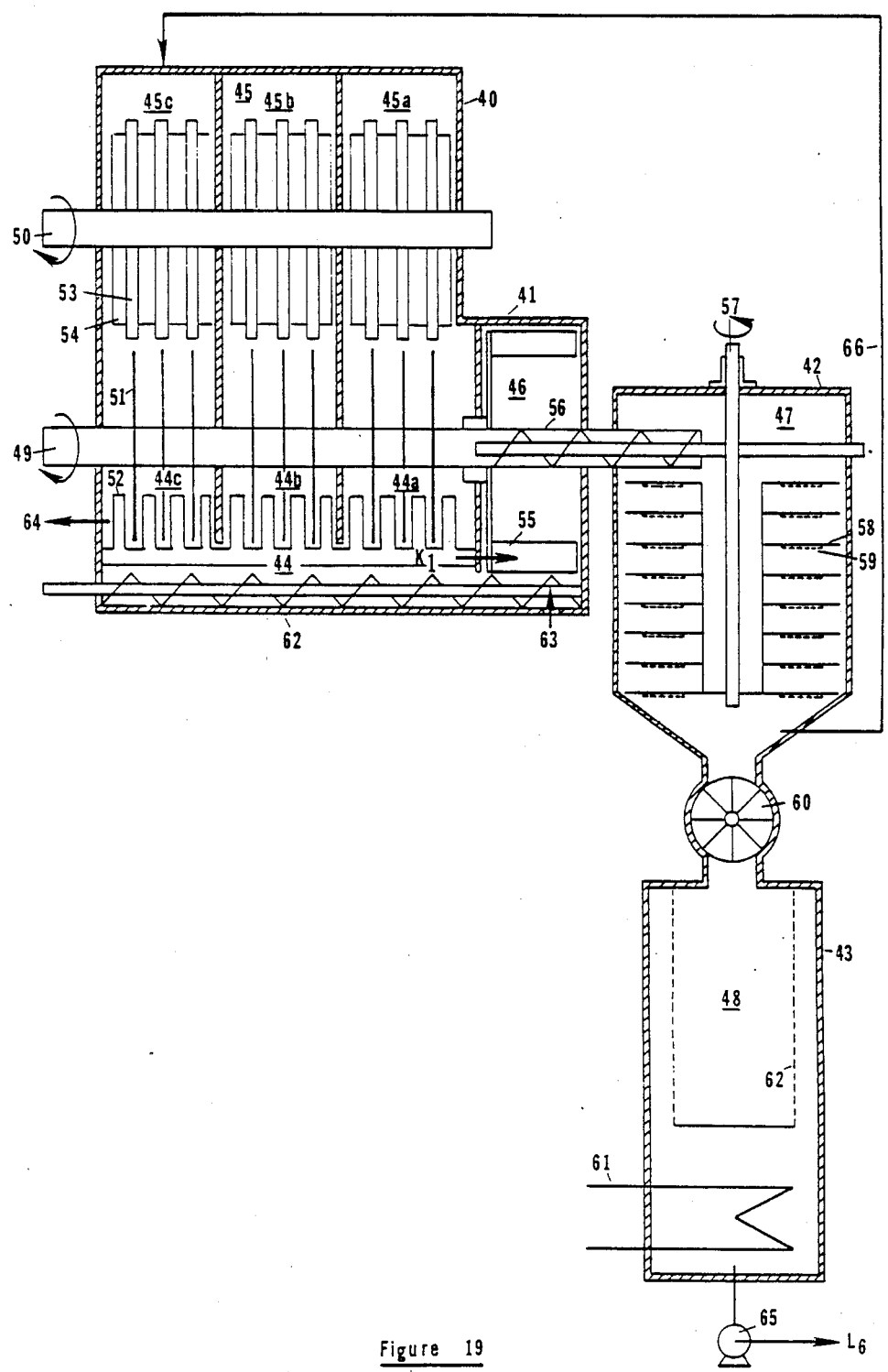
FIG. 19 illustrates an equipment in which the system of FIG. 12 can be conducted; an illustration of an equipment in which the system of FIG. 13 can be conducted is omitted.

FIG. 19 illustrates another system in which a wet and dry distillative freezing process can be conducted. It has a first vacuum enclosure 40, a second vacuum enclosure 41, a third vacuum enclosure 42 and a fourth vacuum enclosure 43. Within the first enclosure 40, there are a wet distillative freezing zone 44 having several freezing sub-zones 44a, 44b, 44c and a condensing zone 45 having several condensing sub-zones 45a, 45b, 45c. There is a crystal washing and separating zone 46 within the second enclosure; there is a dry distillative freezing zone 47 in the third enclosure; there is a crystal melting zone 48 within the fourth enclosure.

There are a rotating shaft 49 penetrating through the wet distillative freezing sub-zones and a rotating shaft 50 penetrating through the condensing sub-zones. Within each freezing sub-zone, there are rotating disks 51 attached to the rotating shaft 49. These disks are partially submerged into liquid and are scraped by stationary blades 52. Within each condensing sub-zone, there are flat condenser plates 53 and rotating scrapers 54 that scrape the condenser plate surfaces. These scrapers are attached to the rotating shaft 50. Within the crystal washing and separating zone 46, there are rotating baskets 55 and a screw conveyor 56. The screw conveyor connects the washing zone to the dry distillative freezing zone. Within the dry distillative freezing zone, there are a rotating shaft 57, rotating disks 58 provided with slots 59. There is a pressure isolating feeder 60 connecting the dry distillative freezer to the crystal melter. Within the crystal melter, there are a heating coil 61 and a basket 62 holding crystals. There is a screw conveyor 62 that transports crystals through the freezing sub-zones and into the crystal washing sub-zone. There is a feed inlet port 63 in the crystal washing zone; there is a discharge port 64 for discharging impure liquid; there is a product discharge pump 65 to discharge the purified liquid.

In operation, feed is added in the crystal washing zone and liquid flows successivelly through wet freezing sub-zones 44a, 44b and 44c. The rotating disks 51 pick up liquid and the liquid on the disk surface is simultaneously flash vaporized and solidified. The crystals formed on the disk surfaces are scraped off by the stationary scrapers 52 and are discharged into the screw conveyor 62. The solid-liquid mixture leaving the first wet freezer 44a is the $K_1$ mixture. The low pressure vapor formed is condensed on the condenser plates 53 and the solid condensate is scraped off the condenser plates by the rotating scrapers 54. Both the liquid and solid condensates are allowed to fall into the freezers. The $K_1$ mixture is washed by the feed and the resulting mixture is drained by the rotating baskets. The drained mixture becomes $K_2$ mixture that is taken to the dry distillative freezer by the screw conveyor 56. The $K_2$ mixture is subjected to a dry distillative freezing operation as it falls through the rotating disks 58 and form a low pressure vapor $V_3$ and a mass of refined B-solid $S_3$. The disks are rotated by the rotating shaft 57. The low pressure vapor flows through the slots 59 provided on the disks and is taken to the last condensing subzone 45c through a conduit 66. The purified solid $S_3$ is transferred through a pressure isolating feeder 60 into the melting zone. In the melting zone, some purified B-liquid is vaporized by a heating medium in the heating coil and the vapor is brought in contact with crystals to thereby melt the crystals. Purified B-liquid is discharged through the discharge pump 65.

6. Industrial Application

Wet and dry distillative freezing process is an energy conserving process for separating mixtures and super-purifying chemicals. It can be used to separate mixtures with high impurity concentrations and the feed may contain low volatility impurities. Some interesting applications are separations of azeotropic mixtures and close boiling mixtures and recovery of solvents used in extraction operations. Examples of chemicals that can be purified by the process are listed as follows: acetic acid, acetonitrile, adipic acid, benzene, cyclohexane, 4-cresol, p-dichlorobenzene, dichloroethane, maleic anhydride, phenol, p-phenylenediamine, styrene, o-xylene and p-xylene.

What we claim as our invention are as follows:

1. A wet and dry distillative freezing process for separating a feed mixture that contains a volatile crystallizing component, denoted as B-component, and one or more non-crystallizing components into a refined B-product and a B-lean product through formation of a mass of B-enriched solid that comprises the following steps:

(1) a first step of forming a condensed mass, denoted as the first step condensed mass, which contains a mass of B-enriched solid phase by removing heat from at least a major part of the feed mixture, (2) a second step of bringing a mass of liquid in contact with the first step condensed mass to thereby form a solid-liquid mixture, denoted as the second step condensed mass and $K_2$ mixture, which has a solid phase mass $S_2$, enriched in B-component, and a mother liquor phase mass $M_2$ that contains the B-component and one or more volatile and noncrystallizing components, the volatile and non-crystallizing component present in the greatest amount in the $K_2$ mixture, denoted as A-component, and the B-component forming a pair of two key volatile components, wherein the two key volatile components form a binary system (a) whose characteristic vapor pressure ratio defined as the ratio of the vapor pressure of A-component to that of B-component both evaluated at the triple point temperature of B-component is in the range of 0.1 to 10 and is less than the ratio of the heat of sublimation to the heat of melting of B-component evaluated at the triple point temperature of B-component, and (b) whose constant pressure phase diagram that includes a three phase (B-enriched solid, liquid and vapor) state has a two phase (B-enriched solid and vapor) region covering a substantial concentration range above the temperature of the three phase state and a two phase (B-enriched solid and liquid) region below the temperature of the three phase state, and (3) a third step of subjecting the $K_2$ mixture to a dry distillative freezing operation by concurrently vaporizing the volatile components from the mixture in a first zone under a first temperature and first pressure that are respectively lower than the triple point temperature and the triple point pressure of the pure B-component to form a vapor mixture, denoted as the third step vapor, and a condensed mass, denoted as the third step condensed mass, which becomes the refined B-product.

2. A process as in claim 1, wherein B-enriched solid is formed as the volatile components are vaporized in the third step and from a major fraction to substantially all of the heat released in the formation of the B-enriched solid is removed by the concurrent vaporizations of the volatile components from the mixture.

3. A process as in claim 1, wherein the said third step is conducted under a substantially adiabatic condition.

4. A process as in claim 2, wherein the said third step is continued until the motor liquor phase in the condensed mass is reduced to a small amount, to thereby transfer from a large fraction to substantially all of the A-component in the $K_2$ mixture to the third step vapor so that the third step condensed mass becomes a mass of purified B-enriched solid.

5. A process as in any one of claims 1 through 4, which further comprise a fourth step of transforming the third step vapor into a condensed mass, denoted as the fourth step condensed mass, from a substantial fraction to all of which is a liquid phase mass, in a second zone by transferring heat therefrom while maintaining the vapor under a second pressure, said second pressure being also lower than the triple point pressure of the B-component, and said second pressure being established without a substantial pressurization of the first vapor.

6. A process as in claim 5, wherein A-component has a greater volatility than the B-component, whereby the fourth step condensed mass constitutes substantially a liquid output that is relatively enriched with the A-component.

7. A process as in claim 5, wherein B-component has a greater volatility than A-component, whereby the fourth step condensed mass includes a solid phase that is relatively enriched with respect to B-component.

8. A process as in claim 5, wherein at least a portion of the fourth step condensed mass is melted by transferring heat to the mass while maintaining the mass under an elevated pressure that is higher than the pressure of the fourth step.

9. A process as in any one of claims 1 through 4, wherein the said first step is accomplished by an indirect freezing operation in which heat is removed from the feed mixture through a heat transfer wall.

10. A process as in any one of claims 1 through 4, wherein the said first step is accomplished by vaporizing the feed mixture under a pressure that is lower than the triple point pressure of the B-component to thereby form a vapor, denoted as the first step vapor.

11. A process as in any one of claims 1 through 4, wherein the first step operation is accomplished by a combination of the second and third step operations so that a part of the third step condensed mass becomes the first step condensed mass, and the said second step is accomplished by mixing a mass of the feed with a mass of the third step condensed mass.

12. A process as in any of claims 1 through 4, wherein the $K_1$ mixture is washed with a wash liquid that contains the B-component and one or more volatile non-crystallizing components to thereby form the $K_2$ mixture.

13. A process as in claim 12, wherein the wash liquid used includes at least a part of the feed liquid.

14. A process as in claim 12, wherein at least part of the wash liquid used is derived from the third step vapor.

15. A process as in claim 12, wherein the wash liquid used includes at least part of the purified B-product.

16. A process as in claim 12, wherein the wash liquid used contains at least one volatile and non-crystallizing component that is not a major component in the feed mixture.

17. A process as in claim 12, wherein the wetness of the $K_2$ mixture, defined as the ratio of the mass of $M_2$ to the total mass of $M_2$ and $S_2$, is less than 50%.

18. A process as in claim 17, wherein the wetness of the $K_2$ mixture is less than 30%.

19. A process as in any one of claims 1 through 4, wherein the said first step is accomplished by vaporizing the feed mixture under a pressure that is lower than the triple point pressure of the B-component to thereby form a vapor, denoted as the first step vapor, and, in the second step, at least a part of the liquid used in contacting the first step condensed mass is derived from the first step vapor.

* * * * *